May 29, 1962 — B. BARÉNYI — 3,036,652
TRUCK-TYPE MOTOR VEHICLE
Filed Feb. 5, 1958 — 3 Sheets-Sheet 1
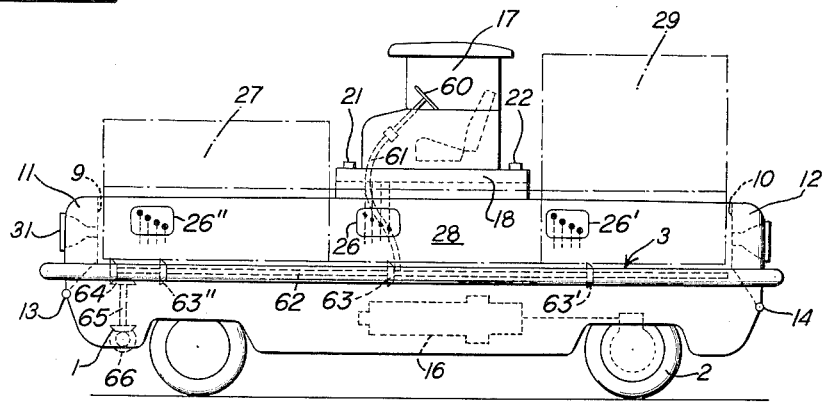
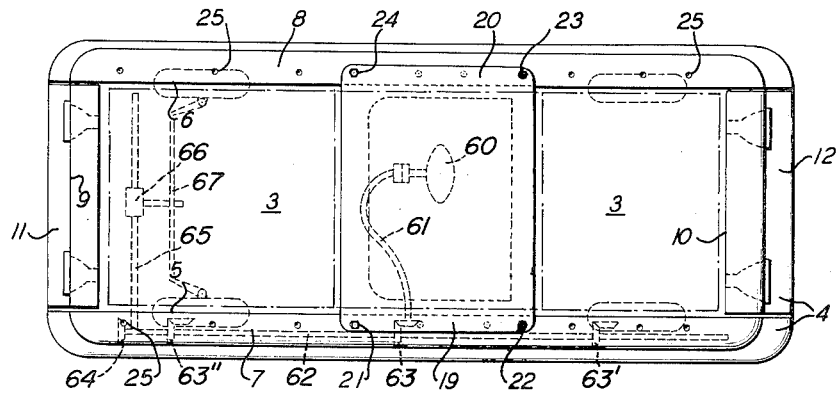
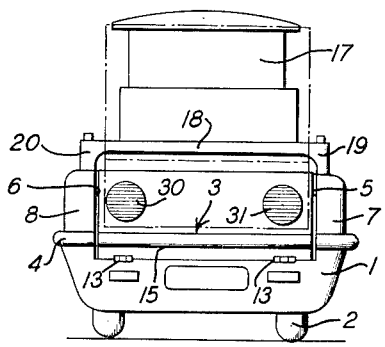
INVENTOR
BÉLA BARÉNYI
BY Dicke and Craig
ATTORNEYS

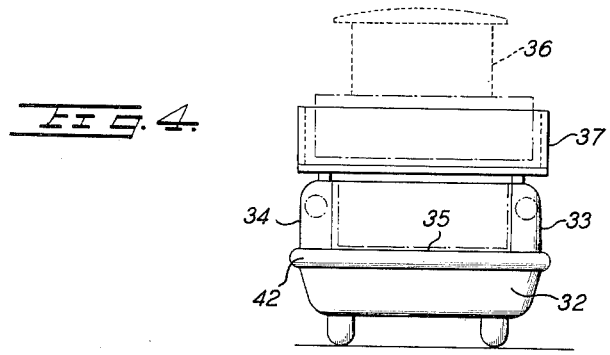
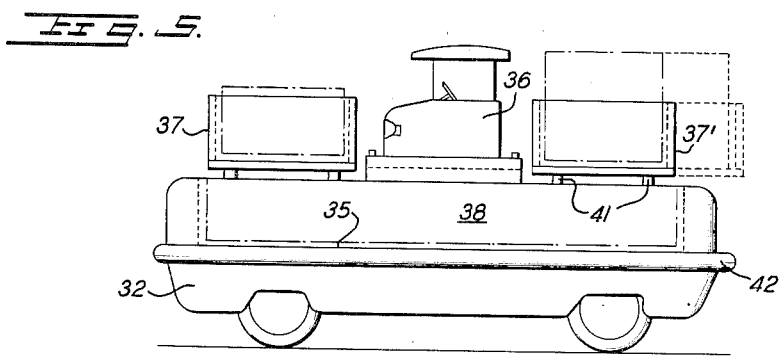
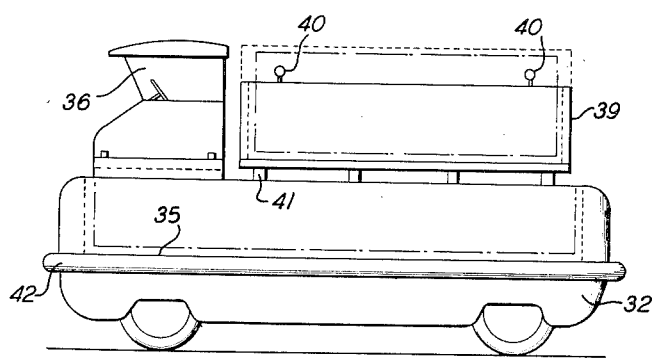

May 29, 1962  B. BARÉNYI  3,036,652
TRUCK-TYPE MOTOR VEHICLE
Filed Feb. 5, 1958  3 Sheets-Sheet 3
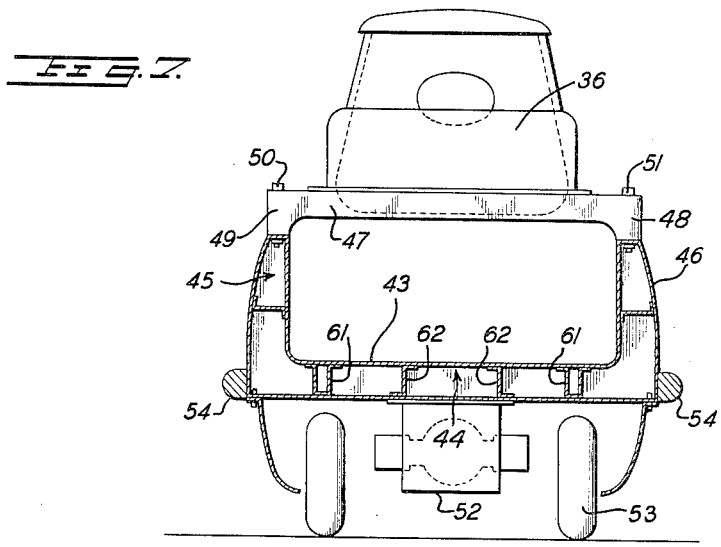
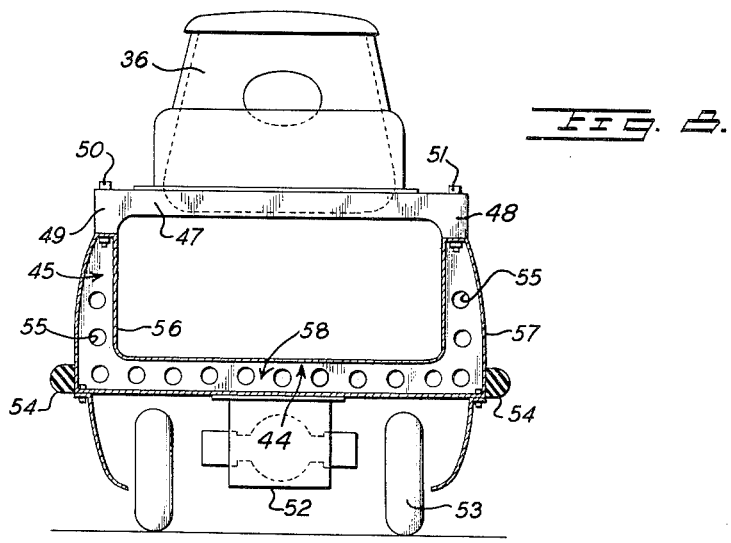
INVENTOR
BÉLA BARÉNYI
BY Dicke and Craig
ATTORNEYS

United States Patent Office 3,036,652
Patented May 29, 1962

3,036,652
TRUCK-TYPE MOTOR VEHICLE
Béla Barényi, Stuttgart-Vaihingen, Germany, assignor to Daimler-Benz Aktiengesellschaft, Stuttgart-Unterturkheim, Germany
Filed Feb. 5, 1958, Ser. No. 713,327
Claims priority, application Germany Feb. 6, 1957
9 Claims. (Cl. 180—54)

The present invention relates to a motor vehicle, and more particularly to the type of motor vehicle suitable for transporting goods, in which the engine is arranged below the loading platform while the driver's cab or compartment is arranged above the loading platform.

The arrangement according to the present invention serves primarily for purposes of increasing the loading platform and therewith to enable loading of the vehicle, not only as customary heretofore from behind and from the side but also from in front thereof, without being impaired by the presence of the driver's cab.

A further purpose of the present invention consists in that the position of the driver's cab may be readily adapted to goods of the different base surface and form which are to be transported by the motor vehicle in accordance with the present invention.

It is a requirement of the present times, with traffic surfaces of the roads becoming relatively more and more narrow as compared with the much less congested traffic lanes of former times, to provide the largest possible loading surfaces on goods carrying vehicles within the limits of available space, and to distribute the payload as evenly as possible on the different wheels of the vehicle in order to obtain with the individual vehicle not only a large loading surface but also to load the same to the largest possible extent.

The present invention essentially consists in that the driver's cab is supported at or on the two longitudinal side walls which laterally limit the loading surface and extend or project upwardly therefrom. These longitudinal side walls may thereby be constructed as double walls and may serve for purposes of accommodating control lines. The driver's cab may thereby constitute a bridge, so to speak, under which especially long objects may be placed, which extend over the entire vehicle length.

By the use of such a construction, it is not only possible to transport such long parts or objects but also to utilize for the same as loading platform the base surface of the driver's cab which was not possible heretofore with any vehicle. By reason of the fact that the lateral upwardly projecting longitudinal walls of the vehicle are constructed of double walls, they constitute, on the one hand, a lightweight construction which does not involve a heavy loading of the vehicle and which nonetheless offers a rather sturdy bearer construction having a sufficiently large resistance moment in order to absorb the weight of the driver's cab. On the other hand, it is possible to accommodate in these side walls of hollow construction the control lines and linkages which conduct and transmit, respectively, the controls and actuation taking place in the driver's cab over the necessary lines to the engine, the steerable wheels, the illuminating devices and other installations.

It is also appropriate if the driver's cab includes a supporting base plate by means of which it is supported on the side walls, and which possibly projects beyond the base surface of the driver's cab. It is possible to achieve by such a construction that the driver's cab may be readily mounted at the side walls or dismantled and removed therefrom. The driver's cab may also be supported with cross or longitudinal bearers at the side walls. If the base plate or the longitudinal bearers or cross bearers are so constructed that they have a U-shaped configuration with lateral downwardly extending leg portions and that they span the two lateral bearer members in the manner of a bay or arch of a bridge, then the space disposed below the driver's cab is even further increased. If not only the side walls but also the base plate are constructed hollow, then the electrical, pneumatic or hydraulic lines or mechanical linkages may be displaced therein which serve for purposes of control and actuation of the engine, clutch, brake, transmission, the electrical installations, and similar devices, as well as for actuation, starting and operating and driving the vehicle. The lines and linkages combined as much as possible into one or several common mains or collective lines may be provided, within the region of the support or abutment places of the driver's cab, with easily disconnectable couplings. This means in practice that at least at one side wall at several places corresponding to the possible support places of the driver's cab, coupling connections are provided which interconnect the lines and linkages placed into the parts of hollow construction of the base plate and of the lateral walls at that particular location each at which the driver's cab is adapted to be mounted.

According to another feature of the present invention, the driver's cab is readily detachably secured at the longitudinal side walls and is thereby adapted to be arranged at different places on the longitudinal side walls in the longitudinal direction of the vehicle.

Accordingly, it is an object of the present invention to provide a motor vehicle which has an increased loading platform and which permits, with a given vehicle length, the transportation of larger objects.

Another object of the present invention is the provision of a truck-type motor vehicle in which the payload may be evenly distributed over all the wheels.

A further object of the present invention resides in the provision of a motor vehicle in which the driver's cab may be readily assembled and disassembled from the vehicle so as to adapt the same to the needs depending on the size, configuration, etc., of the payload to be carried by the vehicle.

Another object of the present invention is to provide a motor vehicle having a loading platform which may be loaded from either the front or the rear of the vehicle.

Still another object of the present invention resides in the provision of a heavy-duty motor vehicle which is adapted to carry a greater payload for a given weight of its own.

These and other objects, features and advantages of the present invention will become more obvious from the following description when taken in connection with the accompanying drawing, which shows, for purposes of illustration only, several embodiments in accordance with the present invention, and wherein:

FIGURE 1 is a front view of a motor vehicle in accordance with the present invention;

FIGURE 2 is a side view of the motor vehicle illustrated in FIGURE 1 in accordance with the present invention and provided with a cab for the driver mounted in the center thereof, FIGURE 3 is a top plan view of the motor vehicle in accordance with the present invention illustrated in FIGURE 2;

FIGURE 4 is a front view of a motor vehicle in accordance with the present invention which is loaded with containers in accordance with the present invention;

FIGURE 5 is a side view of the motor vehicle loaded with containers and provided with a cab mounted in the center thereof in accordance with the present invention;

FIGURE 6 is a side view of a different embodiment of a motor vehicle loaded with containers and provided with a driver's cab arranged in front of the vehicle;

FIGURE 7 is a cross-sectional view through a further modified embodiment of a motor vehicle in accordance with the present invention; and FIGURE 8 is a cross-sectional view similar to FIGURE 7 of still another embodiment of a motor vehicle construction in accordance with the present invention.

Referring now to the drawing, wherein like reference numerals are used throughout the various views and more particularly to FIGURES 1 to 3, the motor vehicle illustrated therein includes a substructure designated by reference numeral 1 which consists of chassis and body. The wheels 2 are secured or suspended in any suitable manner at the substructure 1. The loading surface or platform 3 is disposed at the height of the upper edge of the guard rail 4 which surrounds the vehicle about the entire periphery thereof.

The loading surface 3 is limited laterally by the inner surfaces 5 and 6 of the lateral longitudinal walls 7 and 8, and in front and to the rear thereof by the interior walls or surfaces 9 and 10 of the end walls 11 and 12 thereof. The end walls 11 and 12 are provided with hinges 13 and 14 along the substructure 1 thus enabling the same to form loading bridges, an end wall in FIGURE 1 adapted for this purpose being designated by reference numeral 15. In their normally upright position, the end walls 11 and 12, together with the lateral longitudinal walls 7 and 8 form an enclosure. The driving engine 16 of the vehicle is located as may be clearly seen from FIGURE 2, in the center of the vehicle below the loading surface 3. The driver's cab or compartment 17 is mounted in the illustrated embodiment in the center of the vehicle. The cab 17 includes a base plate 18 which is wider than the loading surface 3 and is supported with the lateral ends 19 and 20 thereof against the two lateral longitudinal walls 7 and 8. The base plate 18 of the cab 17 is secured at the lateral longitudinal walls 7 and 8 by means of bolts 21, 22, 23 and 24 or the like. For purposes of securing the driver's cab 17 in different places, additional threaded bores 25 are provided in the top surfaces of the lateral longitudinal walls 7 and 8 in which the base plate 18 is secured if the driver's cab 17 is to be mounted at a different place. These bores 25 are disposed lengthwise along these top surfaces of the lateral longitudinal walls 7 and 8 along a distance substantially greater than the dimension of the plate 18 in the lengthwise direction of the vehicle so that the plate 18 may be selectively positioned in different locations of the vehicle depending on which of these bores are selected for the mounting thereof. The lines or conduits which are necessary for purposes of operating the vehicle and which lead from the driver's cab 17 to the substructure 1 are combined in a common connecting or coupling member or piece 26 which consists in each case of two readily detachable coupling parts. Coupling construction of this general nature is well known and is illustrated by the German patents to Barenyi, Nos. 852,942 and 873,940. The mechanical, electrical as well as hydraulic lines are combined in this coupling piece. As mentioned before, the various coupling members providing detachable connections for the control lines and actuating linkages may be provided at several places along at least one side wall corresponding to the support places of the driver's cab, three of their places 26, 26', and 26" being schematically indicated in FIGURE 2. Reference numerals 27, 28 and 29 designate the payload consisting of different pieces or objects. Among these, the part 28 is considerable since it is about as long as the entire loading surface 3 and is disposed at least partly below the driver's cab 17. The illuminating devices and installations 30 and 31 are secured in this embodiment at the pivotal end walls 11 and 12.

The controls and actuating lines and linkages, necessary for the operation of the vehicle may be of any well known conventional construction. The particular detachable coupling members also may be of any conventional construction known in the prior art, selected in accordance with the type of control involved. Insofar as the steering of the steerable wheels is concerned, this may also be of conventional construction, indicated only schematically in FIGURES 1 and 2. For that purpose, a conventional steering wheel 60 may be provided which transmits its steering movements to a shaft 62 through a flexible shaft 61 and a set of conventional bevel gears 63. A detachable coupling member of conventional construction located at the place 26 is thereby inserted between the shaft 61 and one of the bevel gears 63. Since the mechanical shaft coupling may be of any appropriate conventional construction details thereof are not shown herein for sake of clarity.

The control movements for the steerable wheels is taken off from shaft 62 through a second set of bevel gears 64 and is transmitted through shaft 65 to the steering gear 66 operatively connected with the steering linkage 67 of conventional construction.

A similar set of bevel gears 63' and 63" is also permanently operatively connected to the shaft 62 within the area of the coupling places 26' and 26" so as to enable connection of the flexible shaft 61 with shaft 62 by means of similar detachable mechanical couplings when the cab 17 together with its plate 18 are moved to a different position. It is, of course, understood that any other suitable mechanical connection may be provided in lieu of that shown only schematically herein.

The embodiments illustrated in FIGURES 4 through 6 show a motor vehicle according to the present invention provided with specially constructed containers. The substructure part is designated in these embodiments by reference numeral 32 on which are mounted the lateral longitudinal bearer members 33 and 34, which in turn limit laterally the loading surface 35. The driver's cab 36 is threadably secured, as in the preceding embodiment, on the longitudinal side walls 33 and 34. In FIGURE 5 the driver's cab 36 is threadably secured in the center of the vehicle. The containers 37 and 37' are wider than the center loading surface 35 and are threadably secured against the lateral longitudinal walls 33 and 34 in a similar manner as the driver's cab 36. Thus, the containers 37 and 37' rest against the upper surfaces of the longitudinal lateral walls 33 and 34 with which they are secured in any suitable manner, for example, by means of bolts and nuts.

In addition to the loading surface 35 of this embodiment, an additional loading space is produced by the presence of the two containers 37 and 37' whereby the distribution of the total payload transported by the vehicle may be equalized by the uniform distribution thereof. Directly on the loading surface 35 is disposed a relatively long object 38 to be transported which also extends below the driver's cab 36.

In the embodiment according to FIGURE 6, the driver's cab 36 is mounted in the front of the vehicle while a larger container 39 which might have been loaded somewhere else and then may have been lifted by means of a crane at the lugs or eyelets 40 thereof onto the vehicle is arranged to the rear of the cab 36 and is secured thereat on the lateral longitudinal walls 33 and 34 in the manner described hereinabove. The bores provided for purposes of securing the cab 36 may also be used for purposes of securing the containers 37, 37' or 39 in which corresponding apertures at the same distance as in the longitudinal side walls 33 and 34 of the vehicle may be provided. In certain cases it is of advantage to mount the containers 37, 37' and 39 elastically at the vehicle. For that purpose, elastic feet may be arranged at the containers or, as shown in the embodiment, elastic insert members or rubber cushions 41 may be disposed between the containers and the longitudinal bearer members 33 and 34. The vehicle illustrated in FIGURES 4 through 6 is again provided with a guard rail 42 of suitable construction.

The cross section illustrated in FIGURE 7 through one embodiment of a motor vehicle in accordance with the present invention illustrates essentially the construction of the bearer structure of the vehicle. The loading surface 43 constituted by a panel or wall is formed by the loading ramp generally designated by reference numeral 44 which is adjoined laterally by the two lateral longitudinal walls generally designated by reference numerals 45 and 46. The loading ramp 44 with the two lateral longitudinal walls 45 and 46 is constructed integrally in the illustrated embodiment to form a unitary part, for example, of light-weight metal, such as aluminum made of box-type construction.

However, the construction may also be so made that U-shaped cross bearer members with relieve apertures 55 are provided at a distance from each other in the longitudinal direction of the vehicle over which the inner and outer walls 56 and 57 made of sheet metal may extend in the longitudinal direction of the vehicle. The U-shaped transverse bearer members are generally designated in FIGURE 8 by reference numeral 58.

Any number of suitable U-shaped reinforcing members 61 and angle irons 62 are provided for purposes of reinforcement of the structure, especially if it is of lightweight double-wall construction as shown in FIGURE 7.

The manner of securing the base plate 47 of the driver's cab 36 is clearly shown in FIGURES 7 and 8. The base plate 47, similarly to the bridge-like ramp 44 with the side members 45 and 46 is also U-shaped so that the downwardly extending leg portions 48 and 49 rest against the upper surfaces of the side walls 45 and 46. Bolts 50 and 51 are used to secure the base plate 47 at the side walls 45 and 46. A housing 52 is arranged below the loading bridge 44 which accommodates the drive aggregate or power unit consisting of engine, flywheel, clutch, transmission and the like. The guard rail 54 is also clearly visible in the embodiment according to FIGURES 7 and 8 which is secured to the loading bridge 44, and more particularly to the outer surfaces of the longitudinal walls 45 and 46 thereof, and which extends around the entire circumference of the vehicle, the latter having conventional wheels 53.

While I have shown and described several embodiments in accordance with the present invention, it is understood that the same is not limited thereto but is susceptible of many changes and modifications within the spirit of the present invention, and I, therefore, wish it to be understood that I intend to cover all such changes and modifications as encompassed by the appended claims.

I claim:

1. A motor vehicle for transporting goods having a flat, horizontal loading surface, comprising an engine located below said loading surface, a driver's cab arranged above said loading surface, two lateral walls laterally limiting said loading surface, said loading surface extending uninterruptedly between said lateral walls, said lateral walls extending upwardly from said loading surface, and means for securing said driver's cab at said lateral walls in spaced relationship with said loading surface so as to provide a free space therebeneath for the accommodation of said goods, said lateral walls comprising surface portions extending lengthwise of said vehicle, said driver's cab comprising a supporting member, said supporting member resting on said surface portions, said securing means comprising fastening elements disposed lengthwise of said surface portions along a distance substantially greater than the dimension of said supporting member in the lengthwise direction of said vehicle, said securing means comprising further fastening elements on said supporting member adapted for cooperation with selected ones of said first fastening elements, said first fastening elements defining a series of selective positions for said supporting member and said driver's cab.

2. A motor vehicle for transporting goods having a flat, horizontal loading surface, comprising an engine located below said loading surface, a driver's cab arranged above said loading surface, two lateral walls laterally limiting said loading surface, said loading surface extending uninterruptedly between said lateral walls, said lateral walls extending upwardly from said loading surface, and means for securing said driver's cab at said lateral walls in spaced relationship with said loading surface so as to provide a free space therebeneath for the accommodation of said goods, said lateral walls each comprising a surface thereon extending substantially the length of said vehicle, each said surface facing in an upward direction, said driver's cab comprising a support resting on said surfaces and slidable therealong into a selected one of a plurality of positions, said positions including positions adjacent the front end and the rear end of said vehicle, said means for securing said driver's cab at said lateral walls comprising detachable means for securing said support in a said selected one of said positions.

3. A motor vehicle according to claim 2, wherein means are provided for accommodating therein the control lines and conduits necessary for operation of the vehicle, said means comprising double walls forming each of said lateral walls, said double walls of each of said lateral walls enclosing a free space extending substantially the length of said vehicle for the accommodation of said control lines and conduits.

4. A motor vehicle according to claim 2, wherein said lateral walls and said loading surface form a rigid unitary structure, said walls being integral with said loading surface.

5. A motor vehicle for transporting goods having a flat, horizontal loading surface, comprising an engine located below said loading surface, a driver's cab arranged above said loading surface, two lateral walls laterally limiting said loading surface, said loading surface extending uninterruptedly between said lateral walls, said lateral walls extending upwardly from said loading surface, and means for securing said driver's cab at said lateral walls in spaced relationship with said loading surface so as to provide a free space therebeneath for the accommodation of said goods, said driver's cab including a base plate, the top portion of each of said lateral walls comprising an upwardly facing surface extending at a constant level substantially in the length of said vehicle, said base plate being provided with portions in contact with each said upwardly facing surface, said means for securing said driver's cab at said lateral walls comprising fastening means for securing said base plate to each said top portion, said fastening means comprising securing means in said top portion defining a plurality of selective positions of said base plate, said fastening means further comprising means cooperating with said base plate and said securing means in said top portion for securing said base plate in one of said selective positions.

6. A motor vehicle according to claim 5, wherein said plurality of selected positions comprising positions adjacent the front end and rear end of said vehicle.

7. A motor vehicle according to claim 2, further comprising mechanical, electrical, hydraulic and pneumatic control means for operating and driving said vehicle and for controlling the engine, brakes, transmission, clutch, and electrical installations thereof, said control means being combined into a common control assembly.

8. A motor vehicle according to claim 2, further comprising container means disposed at least to one side of said driver's cab, and means for detachably securing said container means to the top portions of said lateral walls in spaced relationship to said top portions, said last-named means comprising a plurality of spaced members disposed on each of said top portions.

9. A motor vehicle according to claim 8, wherein said spaced members are formed of rubber.

References Cited in the file of this patent

UNITED STATES PATENTS

| | | |
|---|---|---|
| 1,409,555 | Kruger | Mar. 14, 1922 |
| 2,152,568 | Renno | Mar. 28, 1939 |
| 2,267,509 | Strong | Dec. 23, 1941 |
| 2,271,825 | Martin | Feb. 3, 1942 |
| 2,577,287 | Sullivan | Dec. 4, 1951 |
| 2,600,140 | Torseth | June 10, 1952 |
| 2,623,602 | Double | Dec. 30, 1952 |
| 2,634,816 | Martin | Apr. 14, 1953 |
| 2,647,009 | Huebshman | July 28, 1953 |
| 2,750,225 | Mettetal | June 12, 1956 |
| 2,820,523 | Earl | Jan. 21, 1958 |
| 2,831,544 | Dunn et al. | Apr. 22, 1958 |

FOREIGN PATENTS

| | | |
|---|---|---|
| 874,108 | Germany | Apr. 20, 1953 |